June 17, 1952 — J. P. SIEPE — 2,600,437

FISHING LURE

Filed July 6, 1948

INVENTOR.
John P. Siepe.
BY Stanley Lightfoot
Attorney.

Patented June 17, 1952

2,600,437

UNITED STATES PATENT OFFICE 2,600,437

FISHING LURE

John P. Siepe, Detroit, Mich.

Application July 6, 1948, Serial No. 37,212

4 Claims. (Cl. 43—42.06)

This invention relates to fishing lures more particularly of the type wherein a plug or body member, which may or may not closely resemble a fish, is provided with means such as an offset lip conformed to produce a sinuous movement of the said body as it is drawn through the water and to thereby entice a fish to strike.

Such devices have been heretofore provided which were of tubular form so that water might pass through the bore thereof, and it is an object of the present invention to provide such a tubular device with a hinged or pivoted tail of such form and arrangement as to make use of the variable water currents passing through the bore of the device to promote the waving of the tail from side to side in a manner not only increasing the attractiveness of the lure but tending to assist in promoting the sinuous or fish-like action of the same in its travel through the water.

An important object of the present invention is to produce such movement in the hinged or pivoted tail without the aid of mechanical operating means, whether such operating means are fluid operated or otherwise, and to utilize the action of the stream passing through the tubular body of the device as the sole means of operating the tail in the desired manner.

More particularly, it is an object of the present invention to provide in a tubular body of the type referred to a valve in the form of a tail pivoted intermediate of its length at the rear end of the body with the major portion of the said tail extending from the rear end of the body and the minor portion thereof in advance of the pivot extending into the bore of the body and shaped to act as a baffle for one or other side of the said bore as the device is drawn through the water in the act of fishing.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the simple but novel arrangement of parts hereinafter described, by way of example, having reference to the accompanying drawing, wherein.

Similar characters of reference indicate similar parts in the several figures of the drawing.

Figures 1, 2:
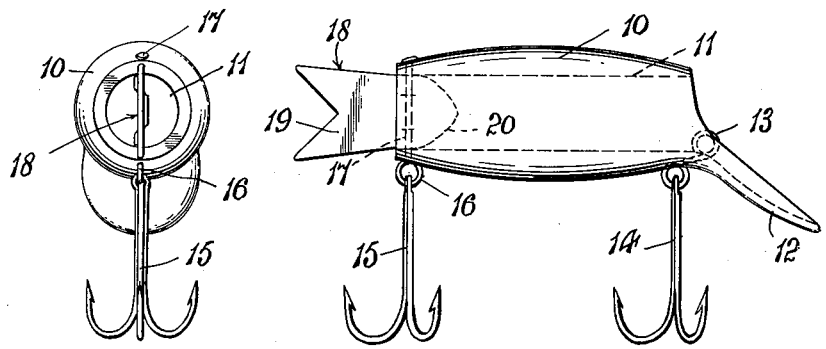
Figure 1 is an elevation of an artificial lure embodying the said invention.
Figure 2 is a rear elevation of the same.
Figure 3:
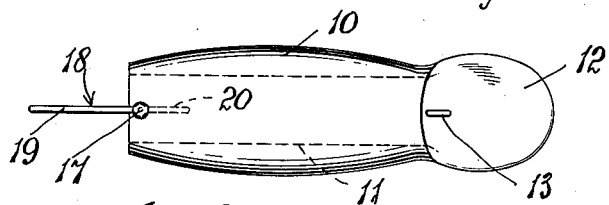
Figure 3 is a plan of the same.

10 indicates the tubular body of an artificial lure characterized by the bore 11 and an offset lip 12 at the forward end to cause the said body to take on a sinuous motion when drawn through the water by a line applied to the eye 13. This type of lure and its action is well known to those familiar with this art and is therefore not described in further detail herein.

Hooks 14 and 15 are such as are commonly provided in such a lure, and the rear hook 15 in the present case is shown as attached to the eye 16 of a vertical pin 17 passing through the rear end of the said body 10.

On this vertical pin is pivotally mounted for oscillation a valve member in the form of a tail generally numbered 18, the major portion 19 of which extends rearwardly of the body 10 and the minor portion 20 extends as a swingable gate into the bore of the body, as will be clear from the illustrations.

Figure 4:
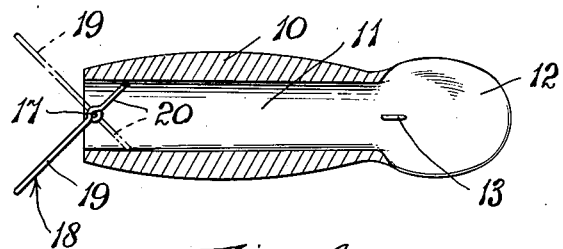
Figure 4 is a horizontal section taken through the bore of the device.

This other portion 20 of the tail 18 is rounded off or suitably shaped so that, when the tail is positioned at an angle to the bore as shown in Figure 4, the edge of the forward portion 20 may more or less closely engage the inner wall of the bore on that side to which it is presented. Obviously, as Figure 4 clearly shows, angular movement of the said tail 18 in one or other direction to its extremes will result in the substantial closing off of that side of the bore. This valve effect will naturally direct the entire stream passing through the bore against what then becomes the frontal surface of the exterior portion of the tail to thereby swing it in the opposite direction to open that side of the bore which was closed and eventually close the opposite side of the bore, which again directs the current of water against the opposite side of the tail; and the cycle is repeated over and over as long as the lure is drawn through the water or as long as water flows through the bore of the lure.

Two factors enter into bringing about and accentuating the oscillation of the tail 18. The well known action of the downwardly extending lip 12, as in other lures similarly equipped, initiates a lateral wobbling of the lure as it is drawn through the water and consequent complementary swinging of the tail portion 19 from side to side. The swaying of the major portion 19 of the tail is, of course, accompanied by the valve-like swaying of the vane or inner minor portion 20 within the bore 11 of the tubular body and its interference with flow through the body. Also, it should be noted that flow of any fluid through a restricted bore is not in parallel with its axis but swirls and fluctuates in its passage therethrough, and this fluctuating action of the water stream in the bore further influences the swaying of the vane-like valve 20 and accentuates the action of the tail portion 19.

This motion of the valve member or tail results in a varying of forces directed against the lure and tends to both time and accentuate the sinuous and jerky fish-like motions of the lure while the motions of the tail in itself also act as an attraction for fish.

It will be immediately observed that no operating mechanisms of any kind are utilized in the manipulating of the tail notwithstanding the fact that the said tail is not merely free to move without regard to its action on the body of the lure. The tail is actually an automatic oscillating valve in itself, and its action is quite positive and effective.

By utilizing the extended vertical stem of the eye 16 as the pivot 17 for the tail, the utmost simplicity of construction is attained.

This invention may be developed within the scope of the following claims without departing from the essential features of the said invention, and it is desired that the specification and drawing be read as being merely illustrative of a practical embodiment of the same and not in a strictly limiting sense.

What I claim is:

1. In a lure of the type described, a tubular body, and a valve member in the form of a substantially flat tail vertically pivoted for free oscillation in the rear end of said body with a minor flat vane portion of said valve member having the configuration of substantially half of the transverse section of the tubular body and extending forwardly of its pivotal axis into and swingable within the bore of the said body.

2. In a lure of the type described, a tubular body, a pivot extending vertically across the rear end of said body, and a valve member in the form of a substantially flat tail mounted for free oscillation on said pivot with a minor flat vane portion of said valve member having the configuration of substantially half of the transverse section of the tubular body and extending forwardly of said pivot into and swingable within the bore of said body.

3. In a lure of the type described, in combination, a tubular body, a downwardly extending offset lip on said body for imparting a sinuous motion thereto when drawn through water, and a valve member in the form of a substantially flat tail vertically pivoted for free oscillation in the rear end of the bore of said body with a minor flat vane portion of said valve member having the configuration of substantially half of the transverse section of the tubular body and extending forwardly of its pivotal axis into and swingable within the bore of said body.

4. In a lure of the type described, in combination, a tubular body, a downwardly extending offset lip on said body for imparting a sinuous motion thereto when drawn through water, a vertical pivot extending across the rear end of said body, and a valve member in the form of a substantially flat tail mounted for free oscillation on said pivot with a minor flat vane portion of said valve member having the configuration of substantially half of the transverse section of the tubular body and extending forwardly of said pivot into and swingable within the bore of said body.

JOHN P. SIEPE.

REFERENCES CITED

The following references are of record in the file of this patent:

UNITED STATES PATENTS

| Number | Name | Date |
| --- | --- | --- |
| D. 153,980 | Raschke | May 31, 1949 |
| 777,491 | Brown | Dec. 13, 1904 |
| 781,794 | Smith | Feb. 7, 1905 |
| 2,065,337 | Lee | Dec. 22, 1936 |
| 2,229,239 | Davis | Jan. 21, 1941 |
| 2,472,639 | Wickens | June 7, 1949 |